US006651952B1

(12) United States Patent
Hightower et al.

(10) Patent No.: US 6,651,952 B1
(45) Date of Patent: Nov. 25, 2003

(54) TWO POSITION ROTARY ACTUATOR INCORPORATING DC SOLENOID

(75) Inventors: Peter C. Hightower, Belvidere, IL (US); Hung-Sun Oh, Rockford, IL (US); Gary B. Burwell, Belvidere, IL (US)

(73) Assignee: Barber Colman Company, Loves Park, IL (US)

( * ) Notice: Subject to any disclaimer, the term of this patent is extended or adjusted under 35 U.S.C. 154(b) by 78 days.

(21) Appl. No.: 09/438,909

(22) Filed: Nov. 12, 1999

Related U.S. Application Data
(60) Provisional application No. 60/108,055, filed on Nov. 12, 1998.

(51) Int. Cl.[7] ............................................... F16K 31/02
(52) U.S. Cl. ..................... 251/69; 251/71; 251/129.13; 251/95
(58) Field of Search ............................. 251/129.13, 69, 251/70, 71, 68, 89, 95

(56) References Cited

U.S. PATENT DOCUMENTS

| | | | | |
|---|---|---|---|---|
| 3,808,895 A | * | 5/1974 | Fitzwater | 74/2 |
| 4,581,987 A | * | 4/1986 | Ulicny | 98/1 |
| 4,741,508 A | * | 5/1988 | Fukamachi | 251/71 |
| 5,182,498 A | * | 1/1993 | Stuhr | 251/69 X |
| 5,983,743 A | * | 11/1999 | McGregor et al. | 251/129.13 X |
| 5,986,369 A | * | 11/1999 | Hanley et al. | 251/69 X |

* cited by examiner

Primary Examiner—Gene Mancene
Assistant Examiner—John Bastianelli
(74) Attorney, Agent, or Firm—Leydig, Voit & Mayer, Ltd.

(57) ABSTRACT

A method and apparatus for controlling a ventilation damper unit utilizing a direct coupled two-position rotary damper actuator with a DC solenoid is disclosed. The actuator acts to rotate the output coupling, and in turn, the damper shaft to open the damper. After approximately 95 degrees +/-3 degrees of output coupling rotation, a limit switch is activated and a DC solenoid equipped with a full way bridge rectifier extends to a brake rotor to lock the damper into position. Simultaneously power is shut-off to the actuator motor assembly to reduce electrical consumption. Upon complete power failure to the actuator unit, such as during a fire and smoke emergency, the DC solenoid is spring returned allowing the damper to be spring returned to a closed position, thus preventing flow of air and smoke through a building and starving a fire of oxygen.

13 Claims, 6 Drawing Sheets

TWO POSITION ROTARY ACTUATOR INCORPORATING DC SOLENOID

RELATED APPLICATION

This application claims priority to co-pending U.S. Provisional Application No. 60/108,055, filed Nov. 12, 1998. The disclosure of said same provisional application is hereby wholly incorporated by reference.

FIELD OF THE INVENTION

The present invention relates to a direct-coupled rotary damper actuator, and more particularly to a two-position actuator having a DC solenoid element for locking a damper in an open position.

BACKGROUND OF THE INVENTION

Invensys Environmental Controls manufactures the MA-2XX series direct-coupled rotary damper actuators. Typically, this series of actuators is mounted to an OEM's smoke and fire air damper to control damper position and thus building air ventilation under normal condition, and to effect a closed damper position whenever desired, e.g., to starve a fire under a fire condition. In the previous design of MA-2XX actuators, when power is applied to the actuator, its output shaft rotates. This rotation drives the damper to the "powered position." After 90 degrees, plus or minus 3 degrees, of output shaft rotation, a limit switch is activated. This activation switches to a shaded pole motor's higher impedance holding winding to reduce power consumption and motor noise, and minimize the motor coil temperature rise. The actuator maintains the fully open position of the damper as long as power is applied to the motor holding coil winding. When power is removed, the force created by the damper spring returns the actuator and the damper to a closed position.

In a typical damper application, the actuator maintains the fully open damper position by energizing t he motor holding coil for the period during which the damper is required to be open because the space affected requires ventilation. The actuator returns the damper to the fully closed position by de-energizing the holding coil when the space affected does not require ventilation. In some instances, a space will require ventilation during the day when it is occupied with people, and ventilation can be shut down at nighttime, or during emergency fire conditions, thus allowing the damper to return to the closed position.

It should be noted that a normally open damper application might also occur, with an actuator utilized to close the damper and a motor holding coil energized for the period during which the damper is required to be closed. The actuator then returns the damper to the fully open position by de-energizing the holding coil when the space affected requires ventilation.

Returning to the more c common normally closed application, for special-use, buildings such as hospitals, prisons, hotels, etc., the time in which the space is occupied or requires ventilation can be unlimited, thus requiring the damper to remain in the open position and the holding coil to remain continuously energized. When the holding coil is continuously energized, long term fretting/wear/corrosion may develop on the gear teeth, journal bearing surface, rotor shaft, and gear shafts, due to the micro-motion generated by AC motor coil amplitude. When the actuator is eventually de-energized, the fretting could adversely affect the return operation of the mechanism.

For the foregoing reasons as well as o other disadvantages not specifically mentioned, there is a need for a mechanical interlock mechanism, such as that found in the present invention, to better ensure reliable operation of the damper, and to create an economical, reliable, compact, and energy efficient alternative for damper control.

SUMMARY

The present invention is directed to a two-position actuator with a DC solenoid element for locking a damper in an open position. An electric motor assembly is mounted within the actuator. A gear train translates rotary power from the motor assembly, through a series of gears, to an output coupling. A brake rotor is interconnected with, and makes up a portion of, the gear train. A solenoid with one of a selection of activation elements is mounted within the housing in a position to allow the particular activation element to apply a braking force on the brake rotor. This prevents rotation of said brake rotor and the gear train.

Such a result is desirable for connection with a ventilation damper. The actuator is mounted to a damper unit and a damper shaft is removably connected to the output coupling. When the actuator is activated, the motor assembly rotates the output coupling via the gear train, which in turn rotates the damper shaft to a desired damper position. Once the desired position is obtained, the solenoid activation element applies a braking force to the brake rotor and maintains the damper position until otherwise instructed.

This position could be held for an unlimited amount of time, however, the device allows for the solenoid to retract and the damper to fall to a closed position upon power failure. Such power failure may occur during, for example, a fire or smoke condition. The solenoid may also be signaled to retract if for some other reason it is desirable for the damper to close.

In the situation of a normally open damper, a similar arrangement exists. The damper position is adjusted via activation of the actuator. Once the desired position is obtained, the solenoid activation element applies a braking force to the brake rotor and maintains the damper position until otherwise instructed. Upon retraction of the solenoid either by controlled instruction or by power failure, the damper returns to the open position.

DESCRIPTION OF THE DRAWINGS

The aforementioned features and advantages, and other features and aspects of the present invention, will become better understood with regard to the following description and accompanying drawings, wherein.

DETAILED DESCRIPTION

Figure 1:
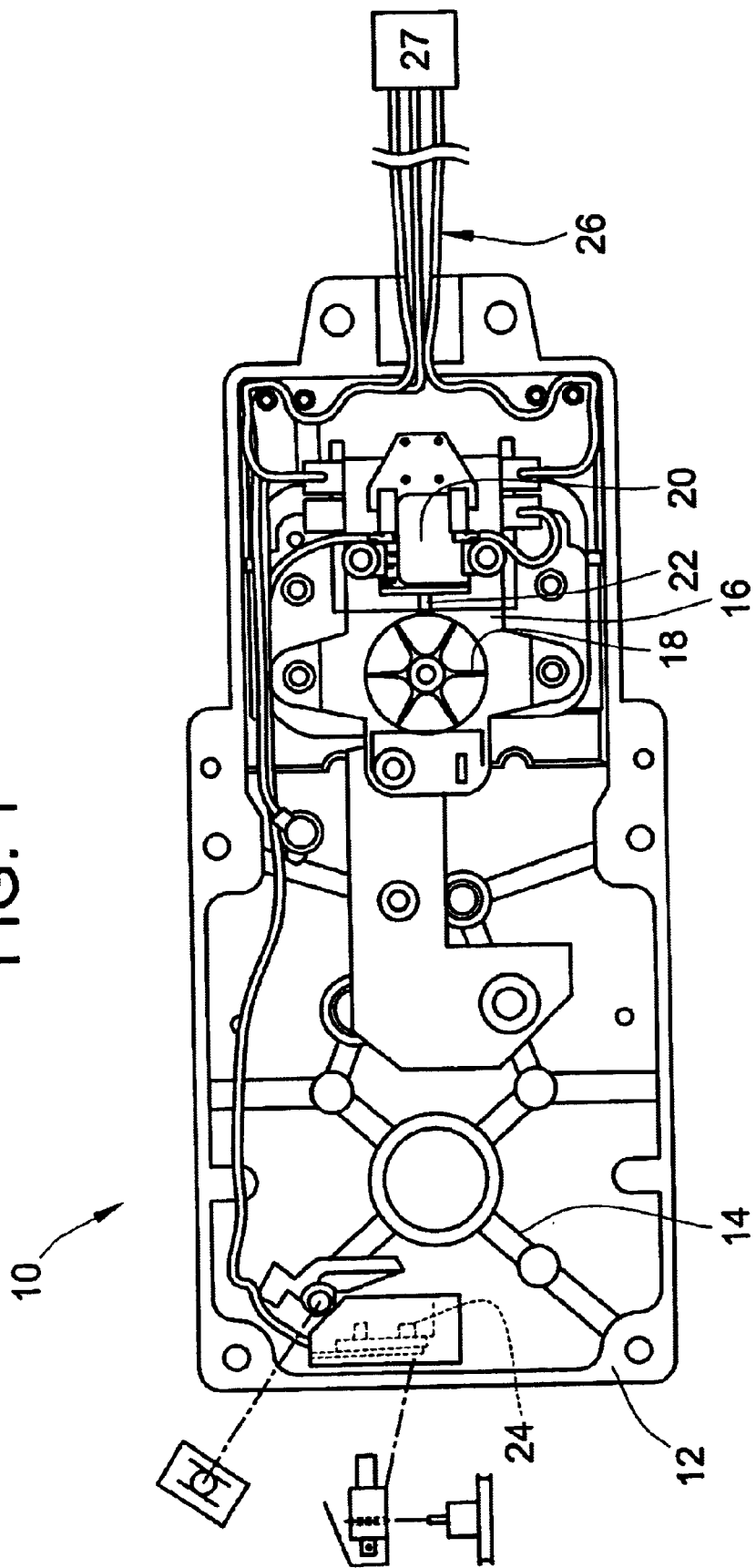
FIG. 1 is a cross-sectional view of an example actuator including a solenoid and limiting switch.

Referring now in detail to the drawings wherein like parts are designated by like reference numerals throughout, there are illustrated in FIGS. 1–4, and 6 representations of two-position actuators of the present invention and portions thereof.

In certain Heating, Ventilating, and Air-conditioning (HVAC) applications, dampers are placed in air-ducts to control airflow through the ducts. The two-position actuator 10 of the present invention is a non-spring return actuator, driven in one direction then returned in the opposite direction by a spring force that is resident in the damper to which the actuator is mounted. It should be noted that an actuator having an internal spring return could also be utilized in conjunction with the present invention. However, for illustrative purposes only, a non-spring return actuator will serve as the primary example for this disclosure.

FIG. 1 illustrates the inner workings of an example two-position actuator 10. Base housing 12 serves as an outer support structure to which inner components are mounted in desired positions. Gear axle supports 14 form a web across a portion of housing 12. Electric motor assembly 16 is provided at one end of housing 12. Integral to motor assembly 16 is motor fan 18. Fan 18 is in mechanical connection to the drive shaft of motor assembly 16, such that when the drive shaft rotates, fan 18 rotates, and vice-versa. By way of example only, fan 18 can be a LUBRICOMP BGU model LTSF-237-11 or a ZYTEL 70G13L 13% glass filled nylon model LTSF-237-01 manufactured by Pyramid Plastics.

Mounted on top of motor assembly 16 is solenoid 20. The example design of FIG. 1 utilizes a small, low cost, spring return linear DC solenoid 20, such as model number LTSF-265 SRS made by Magnet Schultz of America. Solenoid 20 has incorporated within it a full wave bridge rectifier (not shown), which converts AC electricity to DC for powering solenoid 20. Other methods of converting AC electricity to DC, such as a non-integral rectifier, could potentially be utilized in an alternate embodiment.

Figure 2:
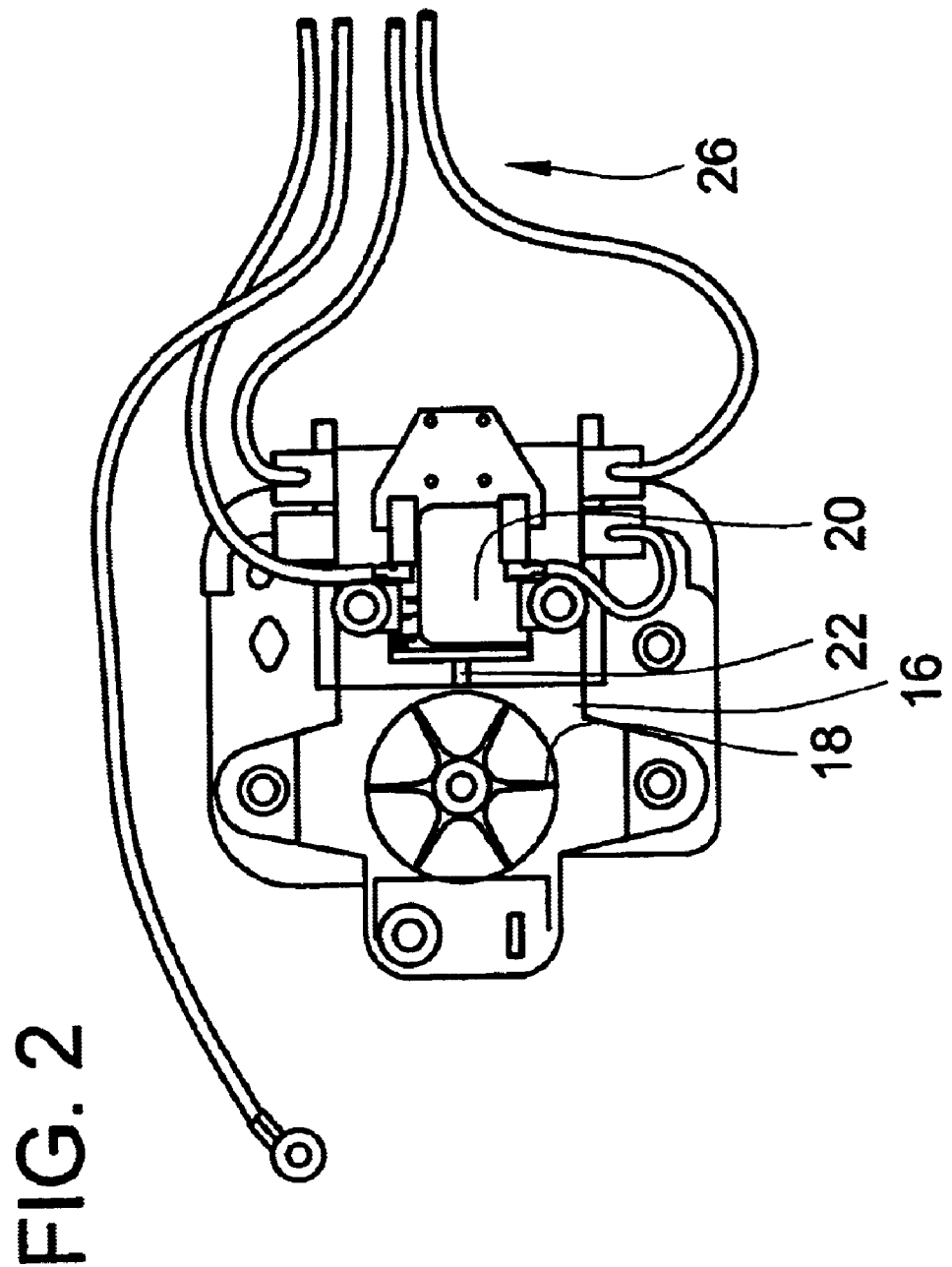
FIG. 2 illustrates the solenoid mounted to the motor within the actuator.
Figure 6:
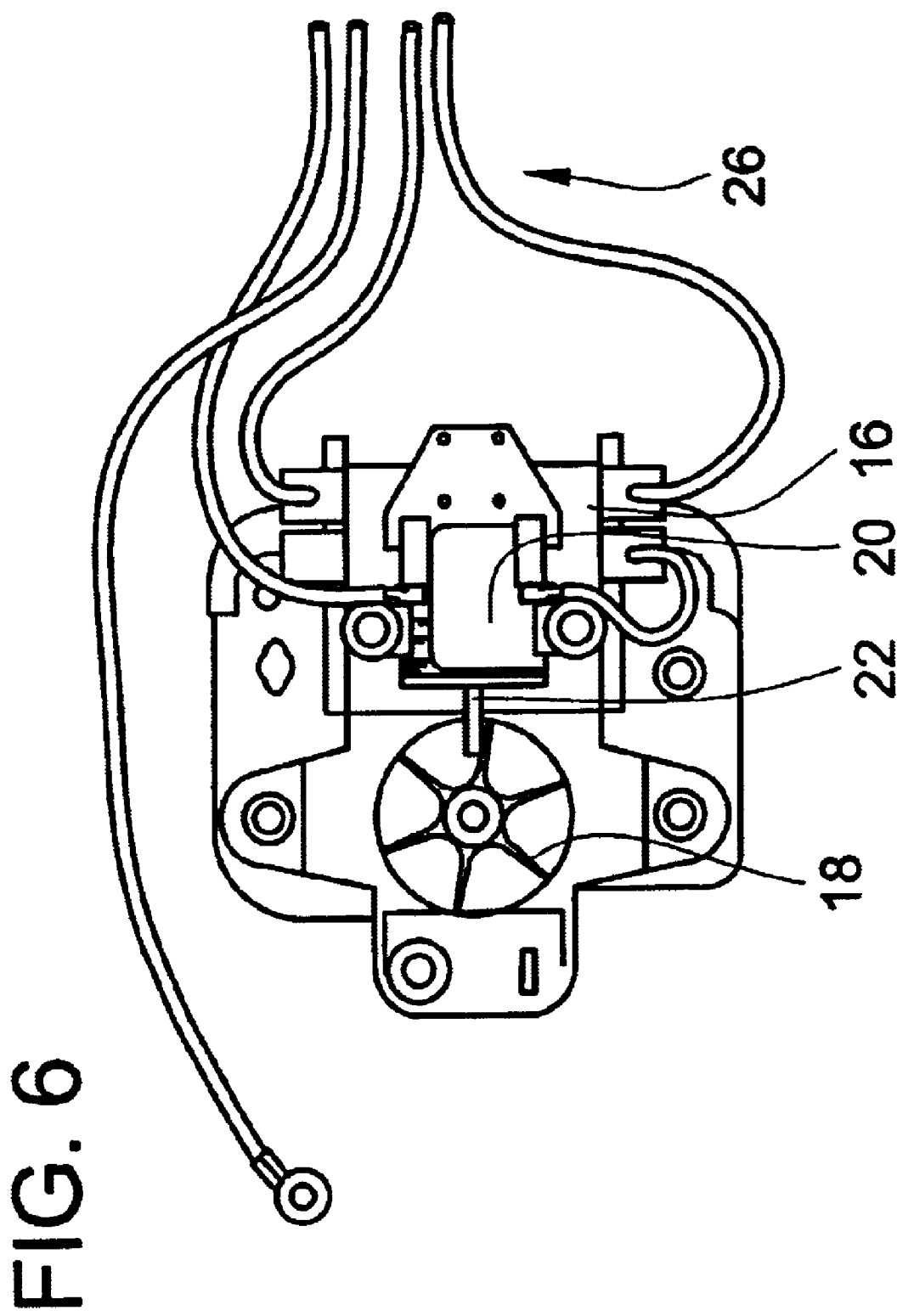
FIG. 6 illustrates the solenoid having its plunger air extended to apply a braking force on the output coupling.

FIG. 2 illustrates solenoid 20 positioned such that plunger pin 22 is extendable into motor fan 18 in a manner such that when plunger pin 22 is extended as illustrated in FIG. 6, motor fan 18 is unable to rotate. In the configuration shown, the actuator 10 is not wired into a limit switch 24. It is contemplated that the limit switch 24 is an optional accessory, its function being as described below.

As illustrated in FIG. 1, sub-miniature limit switch 24 may be included in the actuator 10. As an example, model number E23-259 by Omron, may be utilized. Limit switch 24 is mounted at an opposite end from motor assembly 16 in base housing 12. Electrical wires 26 connect an external AC power source 27 to motor assembly 16, and further interconnect motor assembly 16, solenoid 20, and limit switch 24. An external or internal DC power source could also power the present invention.

Figure 3:
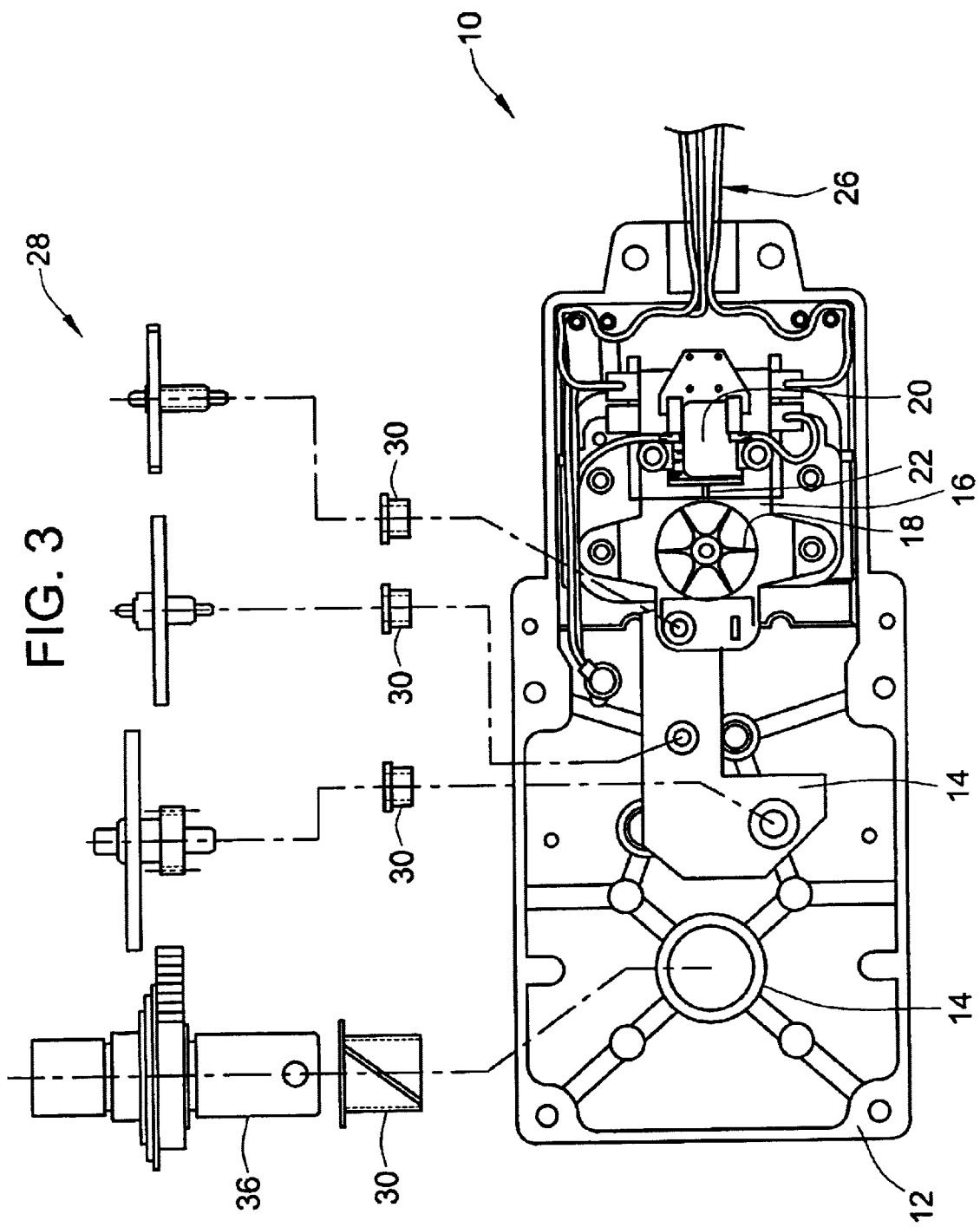
FIG. 3 is a cross-sectional view of an example actuator illustrating the location of the actuator gear train.

FIG. 3 illustrates an example arrangement of gear train 28 in base housing 12. Gear train 28 is comprised of several pinion gears mounted on bearings 30 and includes motor fan 18. Gear train 28 translates power from motor assembly 16 to the output coupling 36 which is in rotational communication with the particular damper unit that the actuator is controlling. Any number of gears with differing gear characteristics and connectivity layouts can be combined to form gear train 28 within actuator 10. Differing performance characteristics, such as speed of rotation and torque, for actuator 10 may result depending on the particular gear train 28 utilized.

Figure 4:
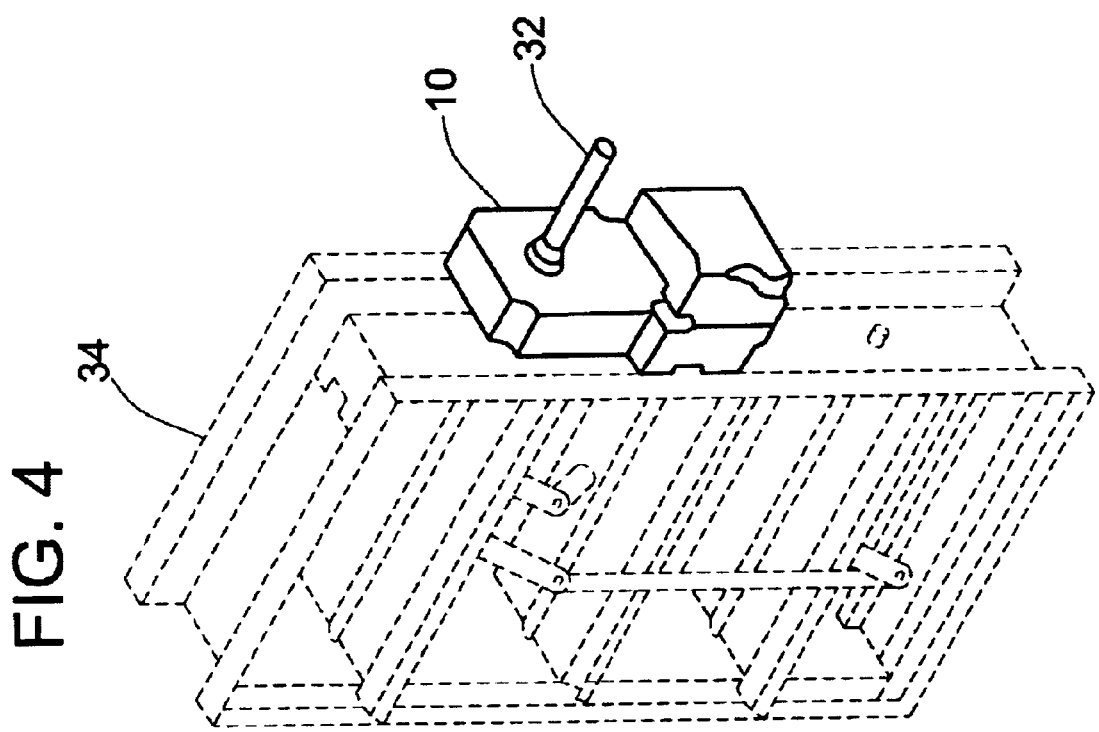
FIG. 4 is a perspective view of an example actuator mounted to a damper.

As illustrated in FIG. 4, actuator 10 is mounted to damper unit 34, (e.g., via screws, rivets, or other fasteners). The damper shaft 32 extends from damper unit 34 through actuator 10 at the output coupling 36 and the drive gear of actuator 10. As the drive gear at the end of gear train 28 rotates, damper shaft 32 rotates to open or close the damper unit 34 as desired.

Figure 5:
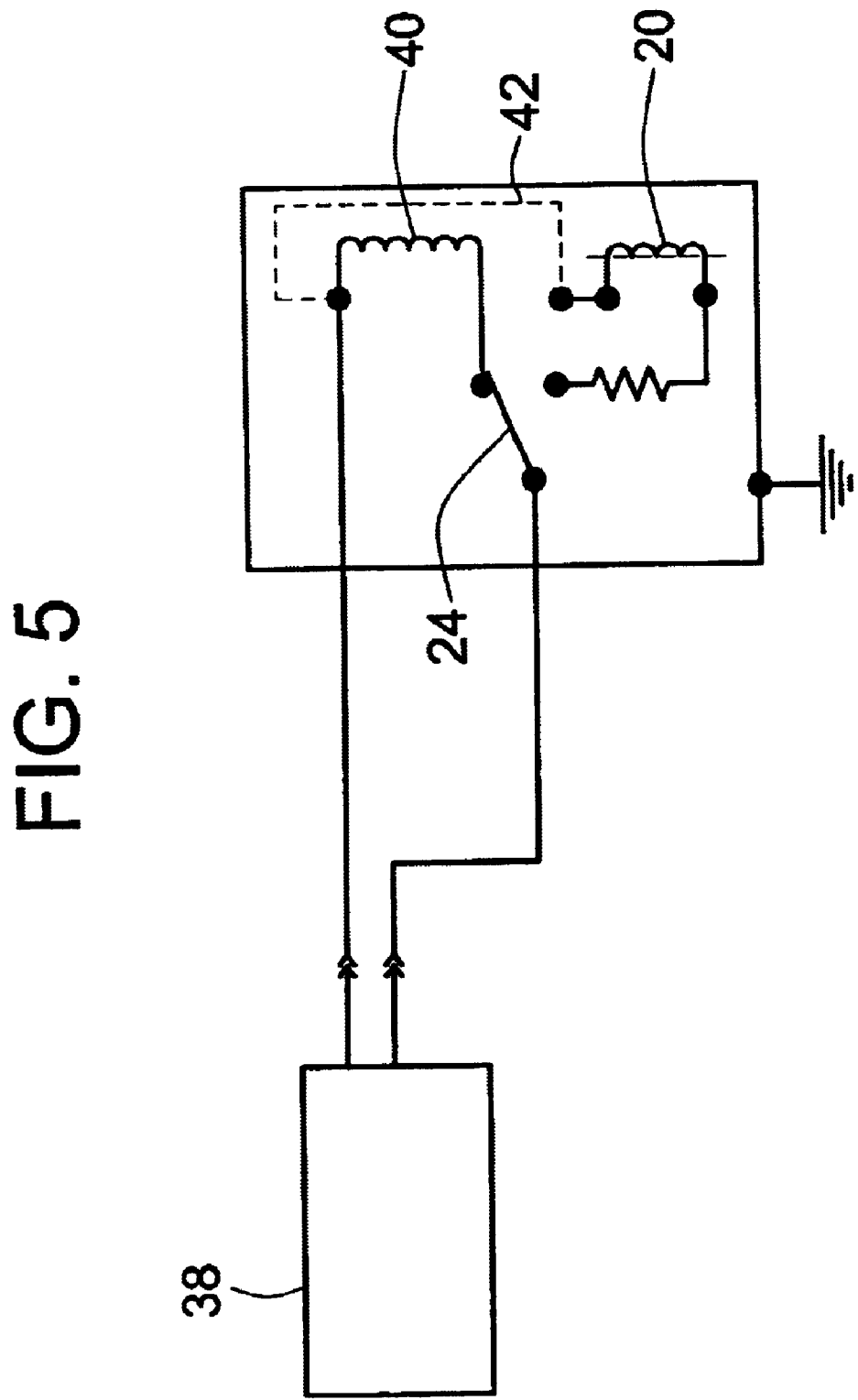
FIG. 5 is a wiring diagram of one embodiment of an example actuator.

FIG. 5 depicts on e example of a wiring configuration for actuator 10. As can be seen, the power supply 38 supplies power to motor coil 40 of the electric motor assembly 16. Power is also supplied, via internal jumper 42 to solenoid 20. The circuit is completed at limit switch 24, shown in the n normally closed position.

Actuator 10 ultimately controls the position of damper unit 34. To open damper unit 34, a power signal is sent to actuator 10. Motor assembly 16 powers gear train 28 to rotate output coupling 36 and thus damper shaft 32 to a desired open damper position. When a desired damper unit 34 position is achieved, power to motor assembly 16 is shut off. Alternatively, after 95 degrees +−3 degrees of output coupling 36 rotation, limit switch 24 is activated to power solenoid 20, and motor assembly 16 is deactivated. Substantially contemporaneous with the shut-off of power to motor assembly 16, activation of solenoid 20 extends plunger pin 22 to interfere with the rotation of motor fan 18 as illustrated in FIG. 6. The plunger pin 22 thus prevents rotation of motor fan 18, gear train 28, output coupling 36, and damper shaft 32, holding damper unit 34 in the desired position. Alternatively, through different wiring arrangements and control configurations, solenoid 20 could be activated prior to the shut-off of power to motor assembly 16, thus halting rotation of output coupling 36 and damper shaft 32, and subsequently cutting power to motor assembly 16. In yet another alternative control scenario, power to motor assembly 16 could be shut-off first, and subsequently, solenoid 20 could be activated to extend plunger pin 22 and halt rotation of the motor fan 18.

When power to solenoid 20 is shut off, either to allow actuator 10 to change damper unit 34 position, or in the event of a fire condition or other, solenoid 20 is spring returned. The retraction of solenoid 20 releases motor fan 18 and gear train 28 as illustrated in FIG. 2, and allows damper unit 34 to return to a closed position under an inherent force caused by gravity acting on the damper, or alternatively via a spring force generated by a spring acting on the damper.

Solenoid 20 is not limited to engaging motor fan 18. Solenoid 20 generally engages a brake mechanism of some form, including but not limited to, e.g., a gear, hub, or fan 18, attached to or integral with the motor shaft (not shown) of motor assembly 16. The motor shaft location for the rotor reduces the forces required by solenoid 20 due to the amplification of the brake torque by gear train 28. A brake rotor with a moment arm, (diameter/radius), greater than motor output shaft 36 further reduces the solenoid 20 force required. Positive engagement between solenoid 20 and the particular brake structure, i.e., slots, ribs, teeth, fan blades, etc., again reduces the force needed to engage and hold in place, actuator 10 and thus damper shaft 32.

Solenoid 20 is further not limited to the plunger pin 22 structure. Solenoid 20 could be of other structure types including but not limited to a rotary or clapper arrangement. The spring return of solenoid 20 could be internal to the solenoid or external. Alternatively, a solenoid could extend a plunger pin or other activation element via a built in spring and require power to retract or release the activation element, thus causing damper unit 34 to close. Such a control system would require sufficient power supply in the form of perhaps a capacitor, battery, generator, or other control signal, to activate the solenoid when there is no power to motor assembly 16. In a third alternative, a solenoid requiring power for both brake release and for braking or holding position could be utilized. This would again require an additional power source for those time periods when power is shut down to the actuator.

Solenoid 20 can be activated by a switch (mechanical or solid state) set off by a sensor sensing variables including but not limited to position, proximity, flow, pressure, time, temperature, or a controller that uses any combination of switches and sensors.

A low friction interface between solenoid 20 and the brake rotor reduces the force required to release the brake rotor as well. A low friction interface can be achieved in various ways involving selection of brake or solenoid materials including additional coatings. Alternatively, the braking system could be a friction brake system rather than a positive brake (continuous rotor) system. In such a design, a high coefficient of friction interface, including but not limited to, urethane rubber would work in conjunction with the rotor. This would additionally reduce the force required by solenoid 20 to activate the brake, and would require far less forced to remove the brake.

Many advantages result from the introduction of solenoid 20 into actuator 10. A DC powered solenoid eliminates any micro motion and noise generated by the solenoid therefore eliminating the root cause of fretting in the solenoid. Elimination of micromotion on gear teeth, journal bearing surface, rotor shaft, and gear shafts, allows the actuator to maintain a damper-open condition for a virtually unlimited period of time without fear of lock-up when circumstances such as smoke and fire conditions occur and the actuator is required to close the damper.

Due to the mechanical interlock holding the damper in position, rather than an electric motor continuously powered to maintain position, in one particular example, power consumption is reduced from approximately 11 watts to approximately 2.5 watts. With tens to hundreds of damper actuators potentially in a building, the reduced power consumption per unit can amount to significant overall cost savings. In addition, the temperature rise within the actuator is negligible relative to that of the continuously powered shaded-pole motor holding coil.

There are numerous features of the present invention that in addition to their useful attributes, also reduce costs. Force requirements of solenoid 20 are reduced due to particular positioning of the motor shaft and motor fan 18 and the effect of amplification of brake torque by gear train 28. A brake rotor with a moment arm greater than that of the motor shaft further reduces solenoid 20 force required. Positive engagement between solenoid 20 and the brake rotor along with low friction brake release characteristics additionally reduce the force requirement of solenoid 20. With every reduction in force requirements of solenoid 20 comes a reduced cost for such solenoid 20, and thus a lower cost actuator 10.

Numerous modifications and alternative embodiments of the invention will be apparent to those skilled in the art in view of the foregoing description. Accordingly, this description is to be construed as illustrative only and is for the purpose of teaching those skilled in the art the best mode for carrying out the invention. Details of the structure may be varied substantially without departing from the spirit and scope of the invention, and exclusive use of all modifications that come within the scope of the appended claims is reserved. It is intended that the invention be limited only to the extent required by the appended claims and the applicable rules of law.

What is claimed is:

1. An actuator, comprising:

a motor assembly;

an output coupling driven by said motor assembly;

a brake interconnected with said output coupling;

a solenoid having an activation element and mounted such that when said solenoid is activated, said activation element acts in conjunction with said brake to effect a braking force on said output coupling and prevent rotation of said output coupling;

a gear train positioned to translate rotational energy from said motor assembly to said output coupling; and wherein said brake is a component of said gear train.

2. The actuator of claim 1, further comprising a limit switch.

3. The actuator of claim 2, wherein said limit switch is in electrical communication with said motor assembly.

4. The actuator of claim 2, further comprising a limit switch is in electrical communication with said solenoid.

5. The actuator of claim 1, wherein said brake is a motor fan.

6. The actuator of claim 5, wherein said solenoid activation element is a plunger pin.

7. The actuator of claim 1, wherein said brake is a friction brake and supports a surface with a coefficient of friction sufficient to react with said solenoid activation element to halt brake rotation as desired.

8. A damper assembly, comprising:

a damper having a damper shaft;

a motor assembly;

an output coupling driven by said motor assembly;

a brake interconnected with said output coupling;

said damper shaft coupled with said output coupling;

a solenoid having an activation element and mounted such that when said solenoid is activated, said activation element acts in conjunction with said brake to effect a braking force on said output coupling and prevent rotation of said output coupling and said damper shaft;

a gear train positioned to translate rotational energy from said motor assembly to said output coupling; and wherein said brake is a component of said gear train.

9. The damper assembly of claim 8, further comprising a limit switch.

10. The damper assembly of claim 9, wherein said limit switch is in electrical communication with said motor assembly.

11. The damper assembly of claim 9, further comprising a limit switch is in electrical communication with solenoid.

12. The damper assembly of claim 8, wherein said brake is a motor fan.

13. The damper assembly of claim 12, wherein said solenoid activation element is a plunger pin.

* * * * *